(12) United States Patent
Ueda (10) Patent No.: US 10,576,628 B2
(45) Date of Patent: Mar. 3, 2020

(54) CONTROLLER AND MACHINE LEARNING DEVICE

(71) Applicant: FANUC CORPORATION, Yamanashi (JP)

(72) Inventor: Tetsuji Ueda, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/995,702

(22) Filed: Jun. 1, 2018

(65) Prior Publication Data

US 2018/0354126 A1    Dec. 13, 2018

(30) Foreign Application Priority Data

Jun. 7, 2017 (JP) ................................. 2017-112209

(51) Int. Cl.
*G05B 19/04* (2006.01)
*G05B 19/18* (2006.01)
*B25J 9/16* (2006.01)

(52) U.S. Cl.
CPC .............. *B25J 9/163* (2013.01); *B25J 9/161* (2013.01); *B25J 9/1633* (2013.01); *B25J 9/1651* (2013.01);
(Continued)

(58) Field of Classification Search
CPC . B25J 9/163; B25J 9/1679; B25J 9/161; B25J 9/1633; B25J 9/1651; G05B 2219/40499
See application file for complete search history.

(56) References Cited

U.S. PATENT DOCUMENTS 4,926,105 A * 5/1990 Mischenko ............. H02P 21/06
318/800
2004/0267404 A1 * 12/2004 Danko ................... B25J 9/1607
700/245
(Continued)

FOREIGN PATENT DOCUMENTS

JP        S6027907 A    2/1985
JP        H03129504 A   6/1991
(Continued)

OTHER PUBLICATIONS

Notification of Reasons for Refusal for Japanese Application No. 2017-112209, dated Jan. 22, 2019, with translation, 6 pages.
(Continued)

*Primary Examiner* — Khoi H Tran
*Assistant Examiner* — Jorge O Peche
(74) *Attorney, Agent, or Firm* — RatnerPrestia (57) ABSTRACT

A machine learning device of a controller observes data on a movement speed of each motor of a robot and an adjustment amount of the movement speed, a target speed of a tip end of the robot, and a movement path proximate to the tip end of the robot, as state variables expressing a current state of an environment, and acquires determination data indicating an appropriateness determination result of the movement speed of the tip end of the robot. Then, the machine learning device learns the target speed data, the movement speed data, and the movement path data in association with the adjustment amount of the movement speed of each of the motors of the robot by using the observed state variables and the acquired determination data.

8 Claims, 8 Drawing Sheets

(52) U.S. Cl.
CPC ... *B25J 9/1679* (2013.01); *G05B 2219/40499* (2013.01)

(56) References Cited

U.S. PATENT DOCUMENTS

| | | | | |
|---|---|---|---|---|
| 2010/0120006 | A1* | 5/2010 | Bell | G09B 23/285 434/267 |
| 2011/0089146 | A1* | 4/2011 | Takahashi | B23K 11/115 219/91.2 |
| 2012/0296471 | A1* | 11/2012 | Inaba | B25J 9/163 700/253 |
| 2013/0338827 | A1* | 12/2013 | One | B25J 9/10 700/252 |
| 2016/0110657 | A1 | 4/2016 | Gibiansky et al. | |
| 2017/0090452 | A1* | 3/2017 | Kanemaru | G05B 19/19 |
| 2017/0091667 | A1 | 3/2017 | Yukawa | |

FOREIGN PATENT DOCUMENTS

| | | |
|---|---|---|
| JP | H04341361 A | 11/1992 |
| JP | 6-285402 A | 10/1994 |
| JP | 2013146814 A | 8/2013 |
| JP | 2013215864 A | 10/2013 |
| JP | 2017062695 A | 3/2017 |
| JP | 2017068566 A | 4/2017 |

OTHER PUBLICATIONS

Decision to Grant a Patent for Japanese Application No. 2017-112209, dated Jul. 23, 2019, with translation, 5 pages.

\* cited by examiner

CONTROLLER AND MACHINE LEARNING DEVICE

CROSS-REFERENCE TO RELATED APPLICATION

This application is a new U.S. Patent Application that claims benefit of Japanese Patent Application No. 2017-112209, filed Jun. 7, 2017, the disclosure of this application is being incorporated herein by reference in its entirety for all purposes.

BACKGROUND OF THE INVENTION

1. Field of the Invention

The present invention relates to a controller and a machine learning device and, in particular, to a controller and a machine learning device that optimize a teaching speed.

2. Description of the Related Art

General industrial robots are driven according to a previously-generated operation program or driven to pass through a teaching point previously taught by a teaching pendant or the like at a teaching speed. That is, the robots are driven at a prescribed speed along a prescribed track. For example, Japanese Patent Application Laid-open No. 6-285402 discloses, as a related art concerned with the teaching operation of a robot, an art by which a sealing operation (such as a teaching point and a teaching speed) is taught to the robot to cause the robot to perform sealing.

According to the art disclosed in Japanese Patent Application Laid-open No. 6-285402, a rotation speed of the motor of a sealing agent supply pump is controlled according to a movement speed of a robot to supply a sealing agent to a sealing gun, whereby an amount of the sealing agent to be coated per unit distance of an object is kept constant regardless of a movement speed of the robot and a film thickness of a bead is kept constant. However, a pump including such a pressure control function is expensive, which causes a reason for an increase in the cost of an entire system. In order to reduce the cost of the entire system, it is considered to perform control so that the sealing gun provided at the tip end of the robot passes through a teaching point, with its movement being kept at a predetermined speed. If such control is adoptable, it is possible to reduce the cost of the entire system using an inexpensive pump capable of controlling only an ON/OFF state. However, a movement path or a movement speed of the tip end of the robot is comprehensively determined with the movement of a plurality of motors, and a change in the movement of the tip end of the robot when the movement of one motor is changed depends on a movement state or an acceleration/deceleration state of another motor. Therefore, even a skilled worker has a difficulty in adjusting the tip end of the robot so as to move along a movement path while keeping its movement speed constant, and is required to repeatedly perform the adjustment by trial and error. As a result, the worker faces the problem of expending enormous efforts to perform the adjustment.

SUMMARY OF THE INVENTION

In view of the above problem, the present invention has an object of providing a controller and a machine learning device capable of adjusting a teaching speed of the tip end of a robot to match a prescribed target speed.

In order to solve the above problem, a controller according to the present invention performs the machine learning of an adjustment amount of a movement speed of each motor of a robot with respect to a target speed of the tip end of the robot, a current speed of each of the motors of the robot, and a movement path of the tip end of the robot and performs control so that a movement speed of the tip end of the robot matches a target speed when the robot moves to a teaching position based on a result of the machine learning.

A controller according to a first embodiment of the present invention adjusts a movement speed of each motor of a robot that performs coating of a sealing material. The controller includes a machine learning device that learns an adjustment amount of the movement speed of each of the motors of the robot. The machine learning device has a state observation section that observes, as state variables expressing a current state of an environment, teaching speed adjustment amount data indicating the adjustment amount of the movement speed of each of the motors of the robot, target speed data indicating a target speed of a tip end of the robot, movement speed data indicating the movement speed of each of the motors of the robot, and movement path data indicating a movement path proximate to the tip end of the robot, a determination data acquisition section that acquires determination data indicating an appropriateness determination result of the movement speed of the tip end of the robot, and a learning section that learns the target speed data, the movement speed data, and the movement path data in association with the adjustment amount of the movement speed of each of the motors of the robot by using the state variables and the determination data.

The determination data may include an appropriateness determination result of a position of the tip end of the robot, besides the appropriateness determination result of the movement speed of the tip end of the robot.

The learning section may have a reward calculation section that calculates a reward associated with the appropriateness determination result, and a value function update section that, by using the reward, updates a function expressing a value of the adjustment amount of the movement speed of each of the motors of the robot with respect to the target speed of the tip end of the robot, the movement speed of each of the motors of the robot, and the movement path proximate to the tip end of the robot.

The learning section may perform calculation of the state variables and the determination data on the basis of a multilayer structure.

The controller may further include a decision-making section that outputs a command value based on the adjustment amount of the movement speed of each of the motors of the robot on a basis of a learning result of the learning section.

The learning section may learn the adjustment amount of the movement speed of each of the motors of the robot in each of a plurality of robots by using the state variables and the determination data obtained for each of the plurality of robots.

The machine learning device may exist in a cloud server.

A machine learning device according to a second embodiment of the present invention learns an adjustment amount of a movement speed of each motor of a robot that performs coating of a sealing material. The machine learning device includes: a state observation section that observes, as state variables expressing a current state of an environment, teaching speed adjustment amount data indicating the adjustment amount of the movement speed of each of the motors of the robot, target speed data indicating a target speed of a tip end of the robot, movement speed data indicating the movement speed of each of the motors of the robot, and movement path data indicating a movement path proximate to the tip end of the robot; a determination data acquisition section that acquires determination data indicating an appropriateness determination result of the movement speed of the tip end of the robot; and a learning section that learns the target speed data, the movement speed data, and the movement path data in association with the adjustment amount of the movement speed of each of the motors of the robot using the state variables and the determination data.

According to an embodiment of the present invention, it is possible to keep a movement speed of the tip end of a robot constant and keep a film thickness of a bead constant without using an expensive pump by the adjustment of a teaching speed of the robot based on a learning result.

DETAILED DESCRIPTION OF THE PREFERRED EMBODIMENTS

Figure 1:
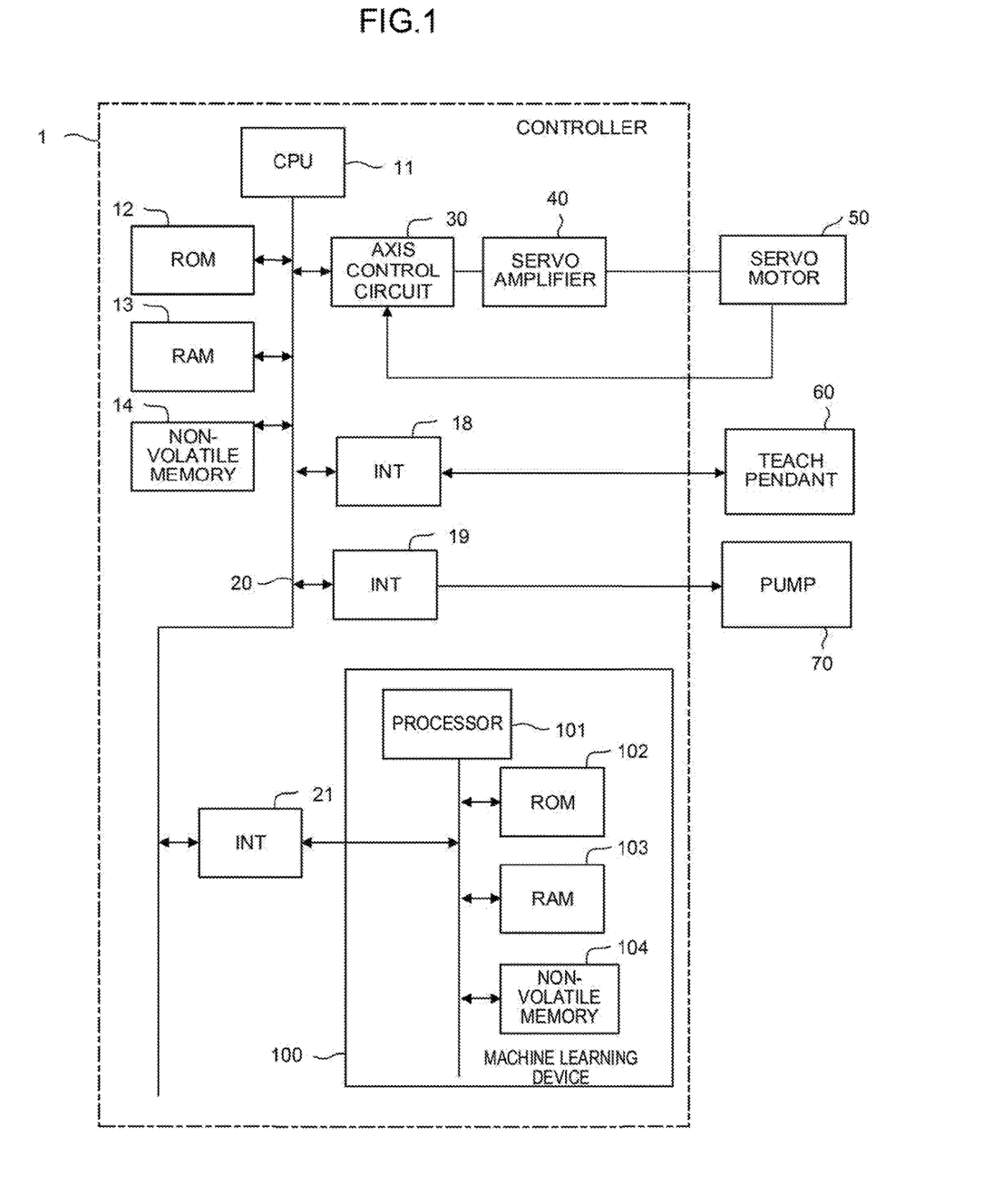
FIG. 1 is a schematic hardware configuration diagram of a controller according to a first embodiment.

FIG. 1 is a schematic hardware configuration diagram showing a controller and the essential parts of a machine tool controlled by the controller according to a first embodiment.

A controller 1 may be mounted as, for example, a controller for controlling an industrial robot (not shown) that performs the coating of a sealing material, or the like. A central processing unit (CPU) 11 of the controller 1 according to the embodiment is a processor that entirely controls the controller 1. The CPU 11 reads a system program stored in a read-only memory (ROM) 12 via a bus 20 and controls the entire controller 1 according to the system program. A random-access memory (RAM) 13 temporarily stores temporary calculation data or display data and various data or the like input by an operator via a teach pendant 60 that will be described later.

A non-volatile memory 14 is constituted as a memory that maintains its storage state by, for example, data backup or the like with a battery (not shown) even if the power of the controller 1 is turned off. The non-volatile memory 14 stores teaching data input from the teach pendant 60 via an interface 18, a robot-controlling program input via an interface (not shown), or the like. Programs or various data stored in the non-volatile memory 14 may be developed into the RAM 13 when run/used. Further, the ROM 12 stores in advance various system programs (including a system program for controlling communication with a machine learning device 100 that will be described later) for running processing for the control of a robot or the teaching of a teaching position, or the like.

An axis control circuit 30 for controlling the axis of a joint or the like of a robot receives a movement command amount of the axis from the CPU 11 and outputs a command for moving the axis to a servo amplifier 40. Upon receiving the command, the servo amplifier 40 drives a servo motor 50 that moves the axis of the robot. The servo motor 50 for the shaft includes a position/speed detection device and feeds back a position/speed feedback signal from the position/speed detection device to the axis control circuit 30 to perform position/speed feedback control. Note that the axis control circuit 30, the servo amplifier 40, and the servo motor 50 are singly shown in the hardware configuration diagram of FIG. 1 but actually provided corresponding to the number of axes of a robot to be controlled. For example, in the case of a robot including six axes, the axis control circuit 30, the servo amplifier 40, and the servo motor 50 are provided for each of the six axes.

The teach pendant 60 is a manual data input device including a display, a handle, a hardware key, or the like. The teach pendant 60 receives information from the controller 1 via the interface 18 to display the same and passes pulses, commands, and various data input from the handle, the hardware key, or the like to the CPU 11.

A pump 70 supplies a sealing material to a sealing gun (not shown) held at the tip end of a robot. Based on a command from the CPU 11 via an interface 19, the pump 70 is capable of turning on/off the supply of the sealing material.

An interface 21 is an interface for connecting the controller 1 and the machine learning device 100 to each other. The machine learning device 100 includes a processor 101 that controls the entire machine learning device 100, a ROM 102 that stores a system program or the like, a RAM 103 that temporarily stores data in each processing associated with machine learning, and a non-volatile memory 104 used to store a learning model or the like. The machine learning device 100 may observe each information (such as position information or speed information of the servo motor 50, a current value, and setting information on a running program, teaching information, or the like stored in the RAM 13 or the like) capable of being acquired by the controller 1 via the interface 21. Further, upon receiving commands for controlling the servo motor 50 and the peripheral device of a robot output from the machine learning device 100, the controller 1 performs the compensation or the like of a command for controlling the robot based on a program or teaching data.

Figure 2:
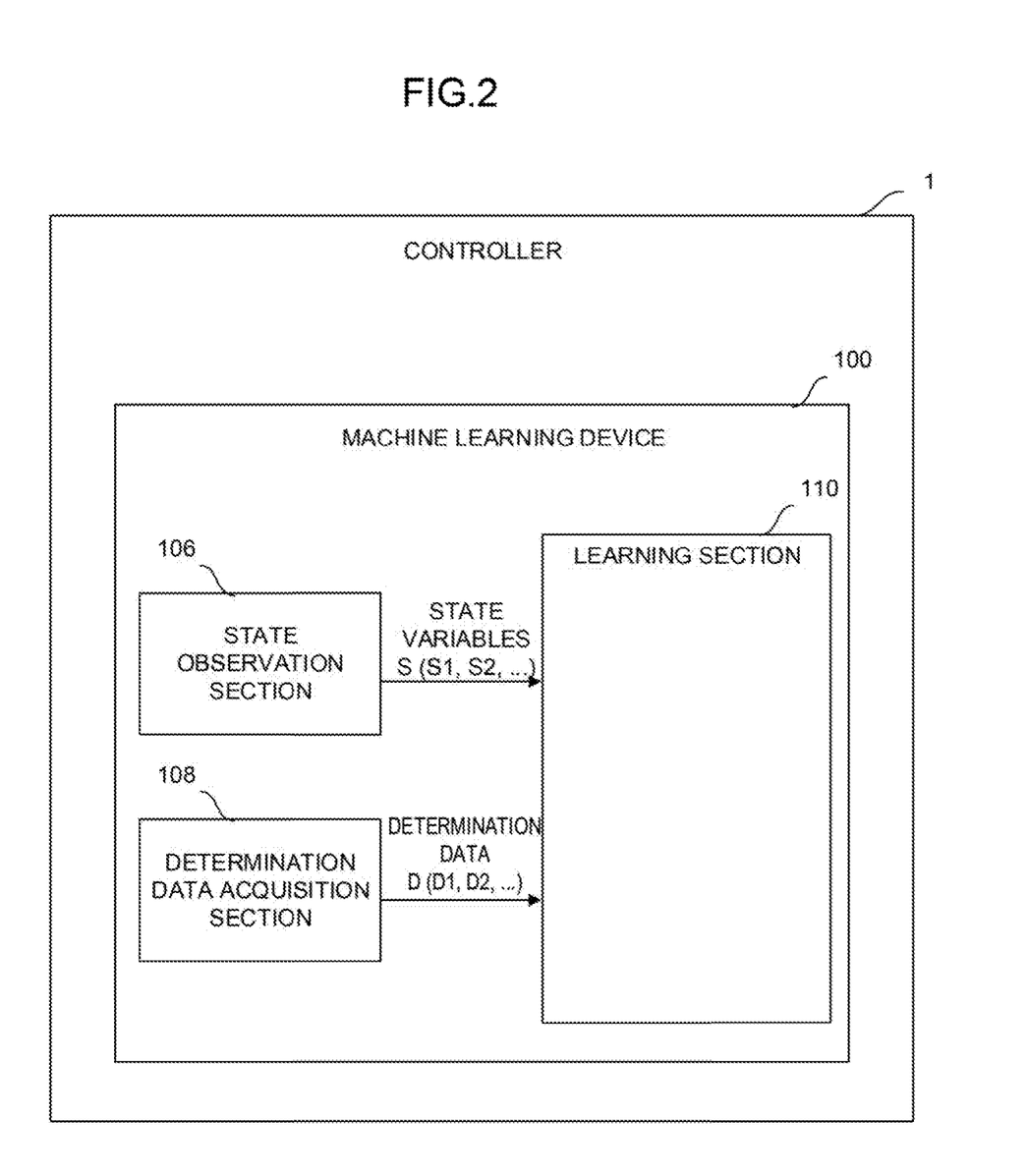
FIG. 2 is a schematic function block diagram of the controller according to the first embodiment.

FIG. 2 is a schematic function block diagram of the controller 1 and the machine learning device 100 according to the first embodiment.

The machine learning device 100 includes software (such as a learning algorithm) and hardware (such as the processor 101) for spontaneously learning an adjustment amount of a movement speed of each of motors of a robot with respect to a target speed of the tip end of the robot, a current speed of each of the motors of the robot, and a movement path of the tip end of the robot through so-called machine learning. An object to be learned by the machine learning device 100 of the controller 1 corresponds to a model structure expressing the correlation between a target speed of the tip end of a robot, a current speed of each of the motors of the robot, a movement path of the tip end of the robot, and an adjustment amount of a movement speed of each of the motors of the robot.

As shown in the function block of FIG. 2, the machine learning device 100 of the controller 1 includes a state observation section 106, a determination data acquisition section 108, and a learning section 110. The state observation section 106 observes state variables S, expressing the current state of an environment, including teaching speed adjustment amount data S1 indicating an adjustment amount of a movement speed of each motor of a robot in the control of the robot based on teaching data, target speed data S2 indicating a target speed of the tip end of the robot, movement speed data S3 indicating a movement speed of each of the motors of the robot, and movement path data S4 indicating a movement path proximate to the tip end of the robot. The determination data acquisition section 108 acquires determination data D including movement speed determination data D1 indicating an appropriateness determination result of the movement speed of the tip end of the robot when a teaching speed of each of the motors is adjusted. Using the state variables S and the determination data D, the learning section 110 learns the target speed of the tip end of the robot, a current speed of each of the motors of the robot, and the movement path of the tip end of the robot in association with the teaching speed adjustment amount data S1.

The state observation section 106 may be configured as, for example, one of the functions of the processor 101 or software stored in the ROM 102 for functioning the processor 101. Among the state variables S observed by the state observation section 106, the teaching speed adjustment amount data S1 may be acquired as a set of adjustment amounts with respect to a movement speed of each motor of a robot. Here, the adjustment amount of the movement speed of each of the motors of the robot includes a direction (a positive/negative value) in which the movement speed of the motor is adjusted.

As the teaching speed adjustment amount data S1, an adjustment amount of a movement speed of each motor of a robot or an adjustment amount of the movement speed of each of the motors acquired from a result simulated by a simulation apparatus reported by a skilled worker and given to the controller 1 may be, for example, used at the start of learning. Further, as the teaching speed adjustment amount data S1, an adjustment amount of a movement speed of each motor of a robot determined by the machine learning device 100 in the previous learning cycle based on a learning result of the learning section 110 may be used when learning is advanced to a certain extent. In such a case, the machine learning device 100 may temporarily store in advance a determined adjustment amount of a movement speed of each motor of a robot in the RAM 103 for each of learning cycles so that the state observation section 106 acquires from the RAM 103 the adjustment amount of the movement speed of each of the motors of the robot determined by the machine learning device 100 in the previous learning cycle.

Further, as the target speed data S2 among the state variables S, a teaching speed or the like set by a worker and included in teaching data may be, for example, used. Since a teaching speed set by a worker is a value set by the worker as a target value, it may be used as a target speed.

As the movement speed data S3 among the stage variables S, a movement speed in the current cycle of each motor (i.e., the servo motor 50) of a robot may be, for example, used. The movement speed data S3 may be acquired using a position and speed detection device attached to a motor.

As the movement path data S4 among the state variables S, a movement path of the tip end of a robot calculated based on a teaching position included in teaching data may be, for example, used. The movement path data S4 may be calculated as series data for each prescribed cycle of relative coordinate values obtained when a movement path within a prescribed period since the current time is seen from the current position of the tip end of a robot.

The determination data acquisition section 108 may be configured as, for example, one of the functions of the processor 101 or software stored in the ROM 102 for functioning the processor 101. As the determination data D, the determination data acquisition section 108 may use movement speed determination data D1 indicating an appropriateness determination value with respect to a movement speed of the tip end of a robot when a teaching speed of each motor is adjusted. The determination data D1 may be calculated from a movement speed of each of the motors of the robot obtained when the state observation section 106 observes the movement speed data S3. The determination data D is an index expressing a result obtained when a robot is controlled under the state variables S.

In terms of the learning cycle of the learning section 110, the state variables S simultaneously input to the learning section 110 are those based on data in the previous learning cycle at which the determination data D has been acquired. As described above, while the machine learning device 100 of the controller 1 advances machine learning, acquisitions of the target speed data S2, the movement speed data S3, and the movement path data S4, and the implementation of controlling a robot according to a teaching speed adjusted based on the teaching speed adjustment amount data S1, and the acquisition of the determination data D are repeatedly performed in an environment.

The learning section 110 may be configured as, for example, one of the functions of the processor 101 or software stored in the ROM 102 for functioning the processor 101. According to any learning algorithm called machine learning, the learning section 110 learns the teaching speed adjustment amount data S1 with respect to a target speed of the tip end of a robot, a movement speed of each of the motors of the robot, and a movement path proximate to the tip end of the robot. The learning section 110 may repeatedly perform learning based on a data set including the state variables S and the determination data D described above. When the cycle of learning the teaching speed adjustment amount data S1 with respect to a target speed of the tip end of a robot, a movement speed of each of the motors of the robot, and a movement path proximate to the tip end of the robot is repeatedly performed, the target speed data S2, the movement speed data S3, and the movement path data S4 among the state variables S are acquired from teaching data or the state of each of the motors acquired in the previous learning cycle as described above, the teaching speed adjustment amount data S1 corresponds to an adjustment amount of the movement speed of each of the motors of the robot acquired based on past learning results, and the determination data D corresponds to an appropriateness determination result with respect to the (adjusted) movement speed of the tip end of the robot in the current learning cycle in a state in which the teaching speed has been adjusted based on the teaching speed adjustment amount data S1.

By repeatedly performing such a learning cycle, the learning section 110 may automatically identify a feature suggesting the correlation between a target speed (target speed data S2) of the tip end of a robot, a movement speed (movement speed data S3) of each of the motors of the robot, and a movement path (movement path data S4) proximate to the tip end of the robot and an adjustment amount of the movement speed of each of the motors of the robot with respect to the state. Although the correlation between the target speed data S2, the movement speed data S3, and the movement path data S4 and an adjustment amount of a movement speed of each motor of a robot is substantially unknown at the start of a learning algorithm, the learning section 110 gradually identifies a feature indicating the correlation and interprets the correlation as learning is advanced. When the correlation between the target speed data S2, the movement speed data S3, and the movement path data S4 and an adjustment amount of a movement speed of each motor is interpreted to a certain reliable extent, learning results repeatedly output by the learning section 110 may be used to select the action (that is, decision making) of determining to what extent a movement speed of each of the motors of the robot is adjusted with respect to a current state (that is, a target speed of the tip end of the robot, a movement speed of each of the motors of the robot, and a movement path proximate to the tip end of the robot). That is, as a learning algorithm is advanced, the learning section 110 may gradually approximate the correlation between a target speed of the tip end of a robot, a movement speed of each of the motors of the robot, and a movement path proximate to the tip end of the robot and the action of determining to what extent a movement speed of each of the motors of the robot is adjusted with respect to the state to an optimum solution.

As described above, in the machine learning device 100 of the controller 1, the learning section 110 learns an adjustment amount of a movement speed of each motor of a robot according to a machine learning algorithm using the state variables S observed by the state observation section 106 and the determination data D acquired by the determination data acquisition section 108. The state variables S are composed of the teaching speed adjustment amount data S1, the target speed data S2, the movement speed data S3, and the movement path data S4, which are hardly influenced by a disturbance. In addition, the determination data D is uniquely calculated by the acquisition of a teaching speed stored in the controller 1 and a movement speed of the servo motor 50 acquired by the controller 1. Accordingly, using learning results of the learning section 110, the machine learning device 100 of the controller 1 may automatically and accurately calculate an adjustment amount of a movement speed of each motor of a robot according to a target speed of the tip end of the robot, a movement speed of each of the motors of the robot, and a movement path proximate to the tip end of the robot without relying on calculation or estimation.

Where it is possible to automatically calculate an adjustment amount of a movement speed of each motor of a robot without relying on calculation or estimation, an appropriate value of the adjustment amount of the movement speed of each of the motors of the robot may be quickly determined only by understanding a target speed (the target speed data S2) of the tip end of the robot, a movement speed (the movement speed data S3) of each of the motors of the robot, and a movement path (the movement path data S4) proximate to the tip end of the robot. Accordingly, a movement speed of each motor of a robot may be efficiently adjusted.

As a first modified example of the machine learning device 100 of the controller 1, the determination data acquisition section 108 may use, as the determination data D, tip end position determination data D2 indicating an appropriateness determination result of the position of the tip end of a robot or the like, besides movement speed determination data D1 indicating an appropriateness determination value of a movement speed of the tip end of the robot.

According to the above modified example, the machine learning device 100 may also consider a deviation degree of a teaching position in the learning of an adjustment amount of a movement speed of each motor of a robot with respect to a target speed of the tip end of the robot, a movement speed of each of the motors of the robot, and a movement path proximate to the tip end of the robot.

As a second modified example of the machine learning device 100 of the controller 1, the learning section 110 may learn an adjustment amount of a movement speed of each motor of a plurality of robots using the state variables S and the determination data D obtained for each of the plurality of robots that performs the same work. According to the configuration, it is possible to increase an amount of a data set including the state variables S and the determination data D acquired in a certain period of time. Therefore, the speed and the reliability of learning an adjustment amount of a movement speed of each motor of a robot may be improved with a set of more various data as inputs.

Figure 3:
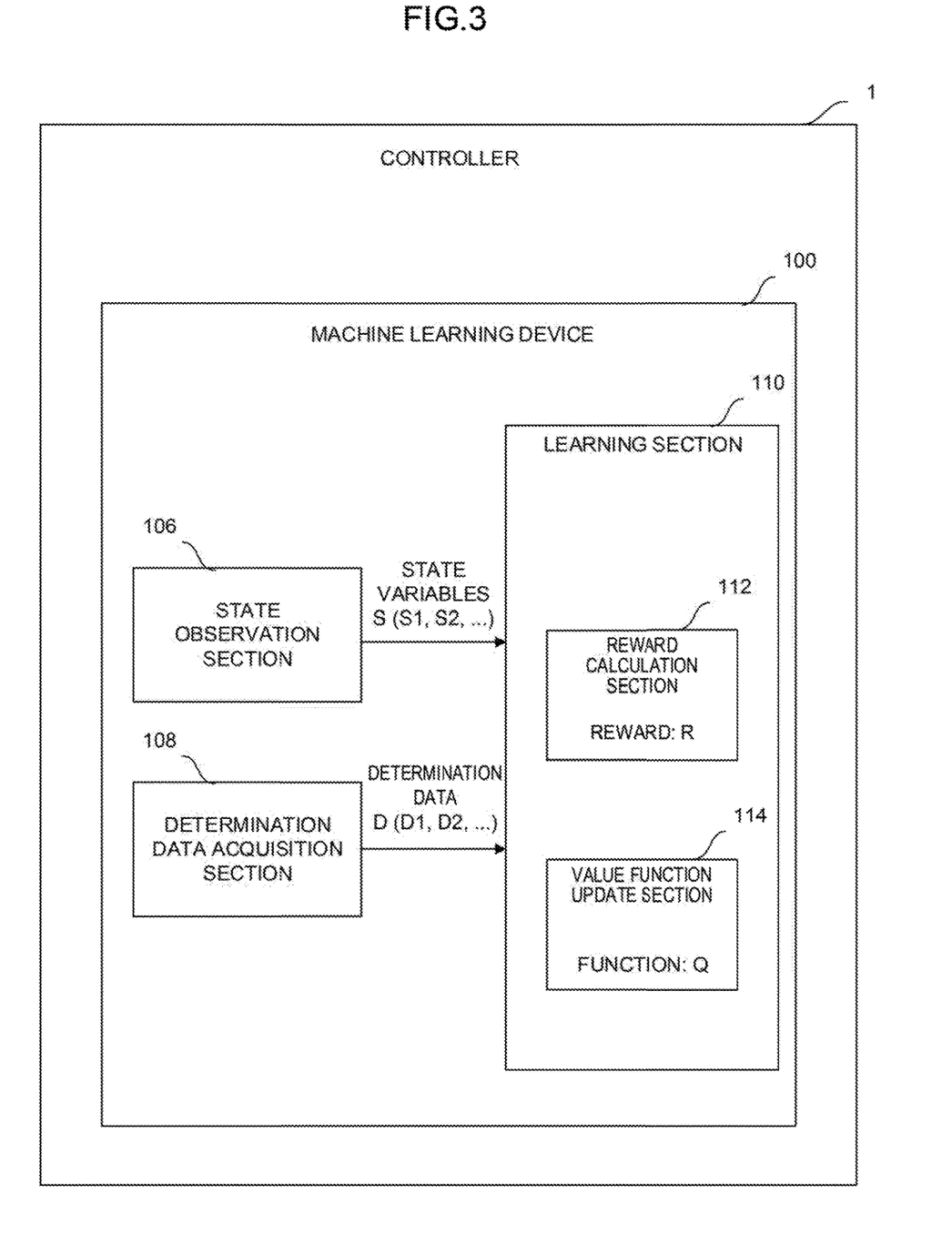
FIG. 3 is a schematic function block diagram showing an embodiment of the controller.

In the machine learning device 100 having the above configuration, a learning algorithm performed by the learning section 110 is not particularly limited. For example, a learning algorithm known as machine learning may be employed. FIG. 3 shows, as an embodiment of the controller 1 shown in FIG. 1, a configuration including the learning section 110 that performs reinforcement learning as an example of a learning algorithm.

The reinforcement learning is a method in which, while the current state (that is, an input) of an environment in which a learning target exists is observed, a prescribed action (that is, an output) is performed in the current state and the cycle of giving any reward to the action is repeatedly performed by trial and error to learn measures (the adjustment of a movement speed of each motor of a robot, in the case of the machine learning device of the present application) to maximize the total of the rewards as an optimum solution.

In the machine learning device 100 of the controller 1 shown in FIG. 3, the learning section 110 includes a reward calculation section 112 and a value function update section 114. The reward calculation section 112 calculates a reward R associated with an appropriateness determination result (corresponding to the determination data D used in the next learning cycle in which the state variables S have been acquired) of the operation state of the tip end of a robot when a teaching speed of each motor is adjusted based on the state variables S. The value function update section 114 updates, using the calculated reward R, a function Q expressing a value of an adjustment amount of a movement speed of each of the motors of the robot. The learning section 110 learns an adjustment amount of a movement speed of each motor of a robot with respect to a target speed of the tip end of the robot, a movement speed of each of the motors of the robot, and a movement path proximate to the tip end of the robot in such a way that the value function update section 114 repeatedly updates the function Q.

An example of a reinforcement learning algorithm performed by the learning section 110 will be described. The algorithm in this example is known as Q-learning and expresses a method in which a state s of an action subject and an action a possibly taken by the action subject in the state s are assumed as independent variables and a function $Q(s, a)$ expressing an action value when the action a is selected in the state s is learned. The selection of the action a by which the value function Q becomes the largest in the state s results in an optimum solution. By starting the Q-learning in a state in which the correlation between the state s and the action a is unknown and repeatedly performing the selection of various actions a by trial and error in any state s, the value function Q is repeatedly updated to be approximated to an optimum solution. Here, when an environment (that is, the state s) changes as the action a is selected in the state s, a reward (that is, weighting of the action a) r is obtained according to the change and the learning is directed to select an action a by which a higher reward r is obtained. Thus, the value function Q may be approximated to an optimum solution in a relatively short period of time.

Generally, the update formula of the value function Q may be expressed like the following Formula (1). In Formula (1), $s_t$ and $a_t$ express a state and an action at time t, respectively, and the state changes to $s_{t+1}$ with the action $a_t$. $r_{t+1}$ expresses a reward obtained when the state changes from $s_t$ to $s_{t+1}$. The term maxQ expresses Q in a case where an action a, by which the maximum value Q is obtained at time t+1 (which is assumed at time t), is performed. $\alpha$ and $\gamma$ express a learning coefficient and a discount rate, respectively, and arbitrarily set to fall within $0<\alpha\leq1$ and $0<\gamma\leq1$, respectively.

$$Q(s_t, a_t) \leftarrow Q(s_t, a_t) + \alpha\left(r_{t+1} + \gamma\max_a Q(s_{t+1}, a) - Q(s_t, a_t)\right). \quad (1)$$

When the learning section 110 performs the Q-learning, the state variables S observed by the state observation section 106 and the determination data D acquired by the determination data acquisition section 108 correspond to the state s in this update formula, the action of determining an adjustment amount of a movement speed of each motor of a robot with respect to a current state (that is, a target speed of the tip end of the robot, a movement speed of each of the motors of the robot, and a movement path proximate to the tip end of the robot) corresponds to the action a in the update formula, and the reward R calculated by the reward calculation section 112 corresponds to the reward r in the update formula. Accordingly, the value function update section 114 repeatedly updates the function Q expressing a value of an adjustment amount of a movement speed of each motor of a robot with respect to a current state by the Q-learning using the reward R.

For example, when the robot is controlled according to a movement speed of each motor adjusted based on an adjustment amount determined after the determination of the adjustment amount of the movement speed of each of the motors of the robot, the reward R calculated by the reward calculation section 112 may be positive (plus) if an appropriateness determination result of the operation state of a robot is determined to be "appropriate" (for example, a case in which the difference between a movement speed and a target speed of the tip end of the robot falls within an allowable range, a case in which the difference between the position of the tip end of the robot and a teaching position falls within an allowable range, or the like), or may be negative (minus) if the appropriateness determination result of the operation state of the robot is determined to be "inappropriate" (for example, a case in which the difference between the movement speed and the target speed of the tip end of the robot goes beyond the allowable range, a case in which the difference between the position of the tip end of the robot and the teaching position goes beyond the allowable range, or the like).

The absolute values of the positive and negative rewards R may be the same or different from each other in the determination of the rewards R. In addition, as determination conditions, a plurality of values included in the determination data D may be combined together to perform a determination.

In addition, an appropriateness determination result of the operation of a robot may include not only "appropriate" and "inappropriate" results but also a plurality of levels of results. As an example, when a maximum value within an allowable range of the difference between a movement speed and a target speed of the tip end of a robot is assumed as $G_{max}$, the reward R=5 is given if the difference G between the movement speed and the target speed of the tip end of the robot falls within $0\leq G<G_{max}/5$, the reward R=2 is given if the difference G falls within $G_{max}/5\leq G<G_{max}/2$, and the reward R=1 is given if the difference G falls within $G_{max}/2\leq G\leq G_{max}$. In addition, $G_{max}$ may be set to be relatively larger at the initial stage of the learning and set to decrease as the learning is advanced.

The value function update section 114 may have an action value table in which the state variables S, the determination data D, and the rewards R are organized in association with action values (for example, numeric values) expressed by the function Q. In this case, the action of updating the function Q with the value function update section 114 is equivalent to the action of updating the action value table with the value function update section 114. At the start of the Q-learning, the correlation between the current state of an environment and an adjustment amount of a movement speed of each motor is unknown. Therefore, in the action value table, various kinds of the state variables S, the determination data D, and the rewards R are prepared in association with values (function Q) of randomly-set action values. Note that the reward calculation section 112 may immediately calculate the rewards R corresponding to the determination data D when the determination data D is known, and values of the calculated rewards R are written in the action value table.

When the Q-learning is advanced using the reward R corresponding to an appropriateness determination result of the operation state of a robot, the learning is directed to select the action of obtaining a higher reward R. Then, values (function Q) of action values for an action performed in a current state are rewritten to update the action value table according to the state of an environment (that is, the state variables S and the determination data D) that changes as the selected action is performed in the current state. By repeatedly performing the update, values (the function Q) of action values displayed in the action value table are rewritten to be larger as an action is more appropriate. Thus, the correlation between a current state (a target speed of the tip end of a robot, a movement speed of each of the motors of the robot, and a movement path proximate to the tip end of the robot) in an unknown environment and a corresponding action (adjustment of the movement speed of each of the motors of the robot) becomes gradually obvious. That is, by the update of the action value table, the relationship between a target speed of the tip end of a robot, a movement speed of each of the motors of the robot, and a movement path proximate to the tip end of the robot and an adjustment amount of the movement speed of each of the motors of the robot is gradually approximated to an optimum solution.

Figure 4:
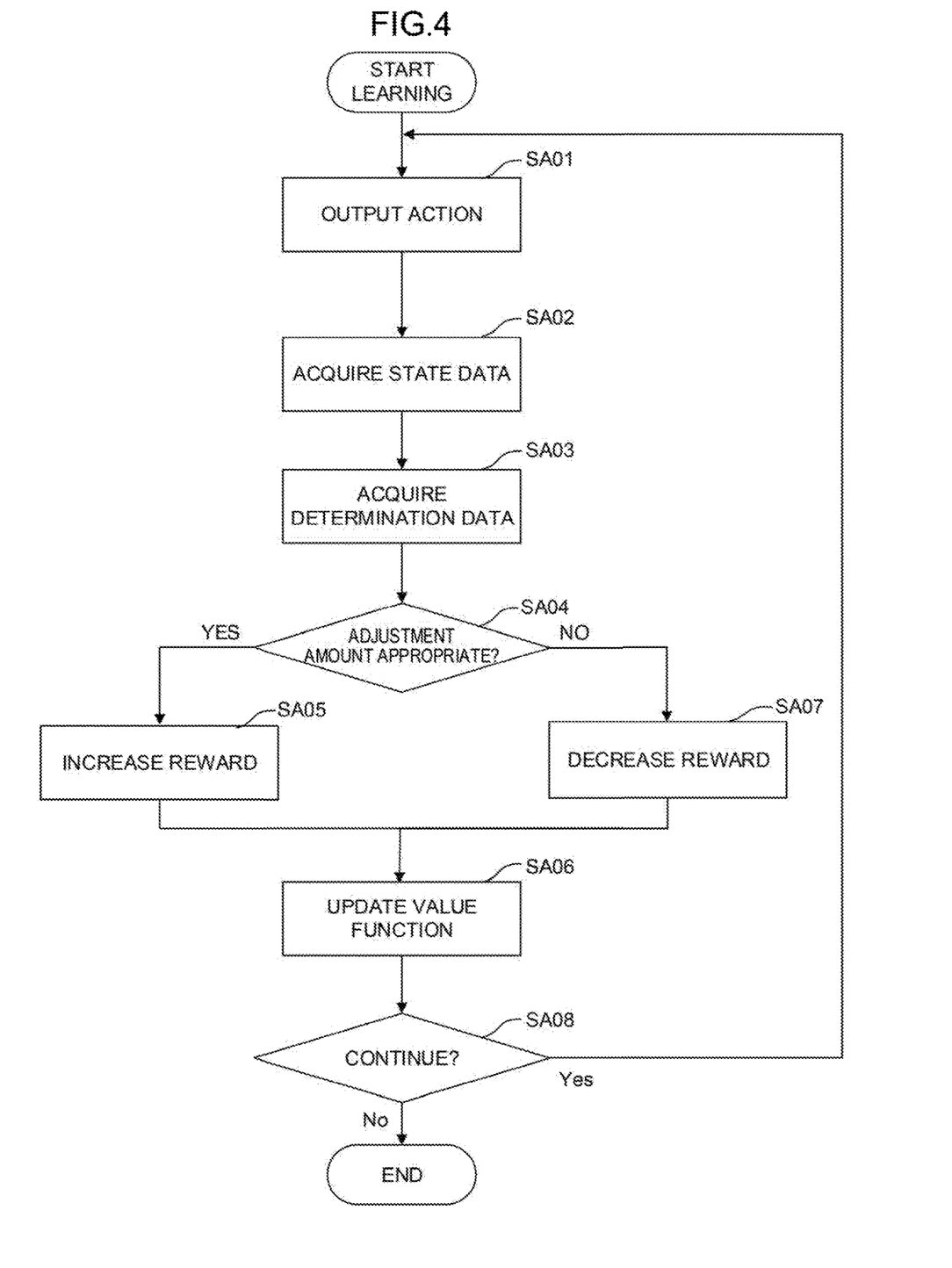
FIG. 4 is a schematic flowchart showing an embodiment of a machine learning method.

The flow of the above Q-learning (that is, an embodiment of a machine learning method) performed by the learning section 110 will be further described with reference to FIG. 4.

First, in step SA01, the value function update section 114 randomly selects, by referring to an action value table at that time, an adjustment amount of a movement speed of each motor of a robot as an action performed in a current state indicated by the state variables S observed by the state observation section 106. Next, the value function update section 114 imports the state variable S in the current state observed by the state observation section 106 in step SA02, and imports the determination data D in the current state acquired by the determination data acquisition section 108 in step SA03. Then, in step SA04, the value function update section 114 determines whether the adjustment amount of the movement speed of each of the motors of the robot is appropriate or not based on the determination data D. If the adjustment amount is appropriate, in step SA05 the value function update section 114 applies a positive reward R calculated by the reward calculation section 112 to the update formula of the function Q. Next, in step SA06, the value function update section 114 updates the action value table using the state variable S and the determination data D in the current state, the reward R, and a value (updated function Q) of an action value. If it is determined in step SA04 that the adjustment amount of the movement speed of each of the motors of the robot is inappropriate, on the other hand, the value function update section 114 applies a negative reward R calculated by the reward calculation section 112 to the update formula of the function Q in step SA07. Then, in step SA06, the value function update section 114 updates the action value table using the state variable S and the determination data D in the current state, the reward R, and the value (updated function Q) of the action value. The learning section 110 updates the action value table over again by repeatedly performing the above processing of steps SA01 to SA07 and advances the learning of the adjustment amount of the movement speed of each of the motors of the robot. Note that the processing of calculating the rewards R and the processing of updating the value function in steps SA04 to SA07 are performed for each of data contained in the determination data D.

Figure 5A:
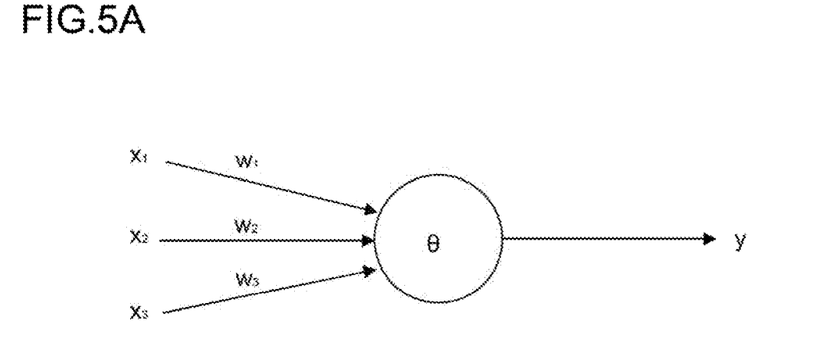
FIG. 5A is a diagram for describing a neuron.
Figure 5B:
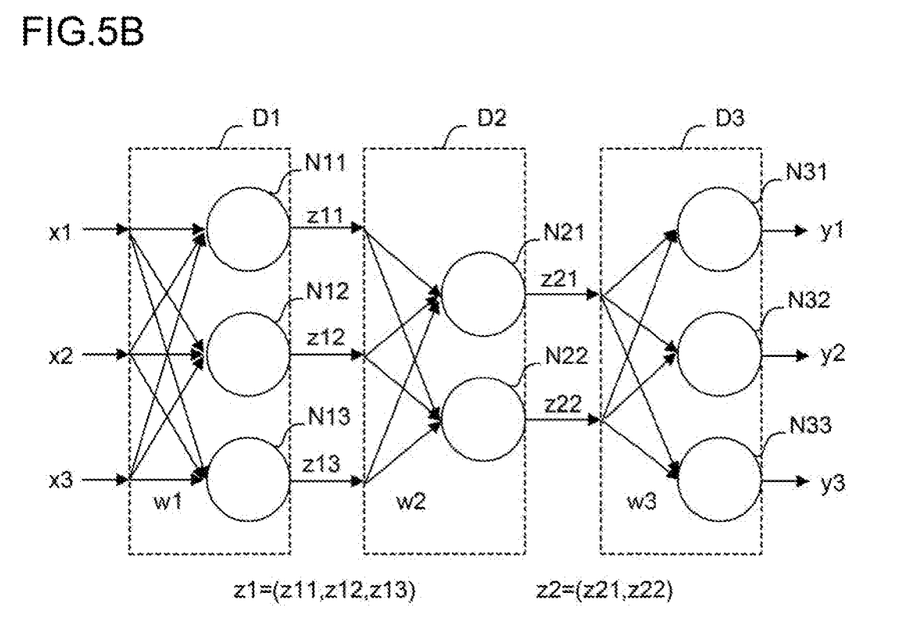
FIG. 5B is a diagram for describing a neural network.

In advancing the above reinforcement learning, a neural network may be used instead of, for example, the Q-learning. FIG. 5A schematically shows a neuron model. FIG. 5B schematically shows the model of a neural network having three layers in which the neurons shown in FIG. 5A are combined together. The neural network may be configured by, for example, a calculation unit, a storage unit, or the like following a neuron model.

The neuron shown in FIG. 5A outputs a result y with respect to a plurality of inputs x (here, inputs $x_1$ to $x_3$ as an example). The inputs $x_1$ to $x_3$ are multiplied by corresponding weights w ($w_1$ to $w_3$), respectively. Thus, the neuron outputs the result y expressed by the following Formula 2. Note that in the following Formula 2, an input x, a result y, and a weight w are all vectors. In addition, θ expresses a bias, and $f_k$ expresses an activation function.

$$y = f_k(\Sigma_{i=1}^n x_i w_i - \theta) \qquad (2)$$

In the neural network having the three layers shown in FIG. 5B, a plurality of inputs x (here, inputs x1 to x3 as an example) is input from the left side of the neural network, and results y (here, results y1 to y3 as an example) are output from the right side of the neural network. In the example shown in FIG. 5B, the inputs x1, X2, and x3 are multiplied by corresponding weights (collectively expressed as w1) and input to three neurons N11, N12, and N13, respectively.

In FIG. 5B, the respective outputs of the neurons N11 to N13 are collectively expressed as z1. The outputs z1 may be regarded as feature vectors obtained by extracting feature amounts of the input vectors. In the example shown in FIG. 5B, the respective feature vectors z1 are multiplied by corresponding weights (collectively expressed as w2) and input to two neurons N21 to N22, respectively. The feature vectors z1 express the features between the weights w1 and the weights w2.

In FIG. 5B, the respective outputs of neurons N21 and N22 are collectively expressed as z2. The outputs z2 may be regarded as feature vectors obtained by extracting feature amounts of the feature vectors z1. In the example shown in FIG. 5B, the respective feature vectors z2 are multiplied by corresponding weights (collectively expressed as w3) and input to three neurons N31, N32, and N33, respectively. The feature vectors z2 express the features between the weights W2 and the weight W3. Finally, the neurons N31 to N33 output the results y1 to y3, respectively.

Note that it is possible to employ so-called deep learning in which a neural network forming three or more layers is used.

In the machine learning device 100 of the controller 1, the learning section 110 performs the calculation of the state variables S and the determination data D as inputs x on the basis of a multilayer structure according to the above neural network so that the learning section 110 may output an adjustment amount (result y) of a movement speed of each motor of a robot. In addition, in the machine learning device 100 of the controller 1, the learning section 110 uses a neural network as a value function in reinforcement learning and performs the calculation of the state variables S and the action a as inputs x on the basis of a multilayer structure according to the above neural network so that the learning section 110 may output a value (result y) of the action in the state. Note that the action mode of the neural network includes a learning mode and a value prediction mode. For example, it is possible to learn a weight w using a learning data set in the learning mode and determine an action value using the learned weight w in the value prediction mode. Note that detection, classification, deduction, or the like may be performed in the value prediction mode.

The configuration of the above controller 1 may be described as a machine learning method (or software) performed by the processor 101. The machine learning method is a method for learning an adjustment amount of a movement speed of each of the motors of the robot. The machine learning method including:

a step of observing, by the CPU of a computer, teaching speed adjustment amount data S1, target speed data S2, movement speed data S3, and movement path data S4, as state variables S expressing the current state of an environment in which the robot is controlled;

a step of acquiring determination data D indicating an appropriateness determination result of the operation state of the robot according to the adjusted movement speed of each of the motors; and a step of learning the target speed data S2, the movement speed data S3, and the movement path data S4 and the adjustment amount of the movement speed of each of the motors of the robot in association with each other using the state variables S and the determination data D.

Figure 6:
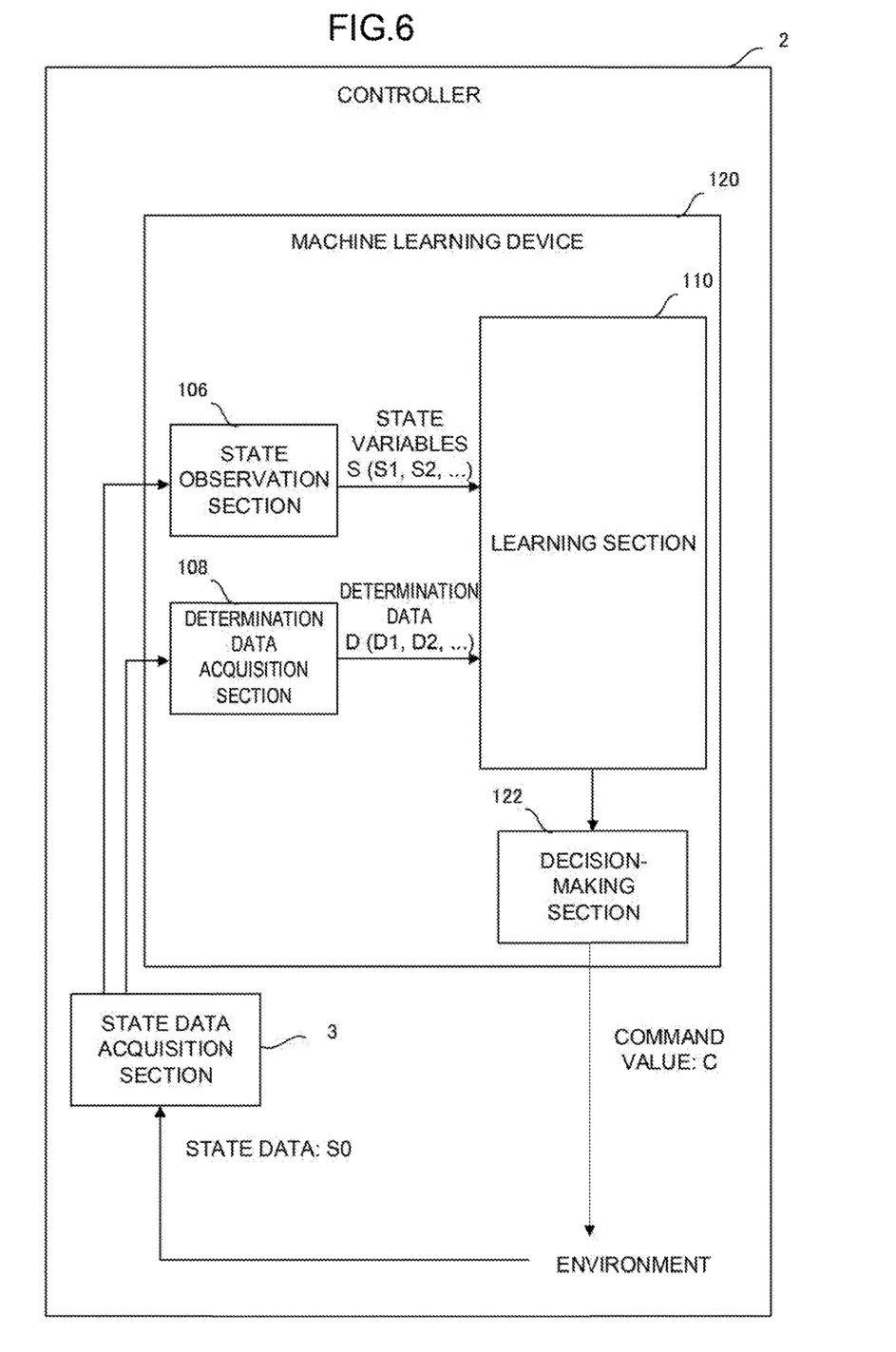
FIG. 6 is a schematic function block diagram of a controller according to a second embodiment.

FIG. 6 shows a controller 2 according to a second embodiment.

The controller 2 includes a machine learning device 120 and a state data acquisition section 3 that acquires teaching speed adjustment amount data S1, target speed data S2, movement speed data S3, and movement path data S4 of the state variables S observed by a state observation section 106, as state data S0. The state data acquisition section 3 may acquire the state data S0 from each section of the controller 2, various sensors of a robot, appropriate data inputs by a worker, or the like.

The machine learning device 120 of the controller 2 includes, besides software (such as a learning algorithm) and hardware (such as the processor 101) for spontaneously learning an adjustment amount of a movement speed of each motor of a robot through machine learning, software (such as a calculation algorithm) and hardware (such as the processor 101) for outputting the learned adjustment amount of the movement speed of each of the motors of the robot as a command for the controller 2. The machine learning device 120 of the controller 2 may be so configured that one common processor performs all software such as a learning algorithm and a calculation algorithm.

A decision-making section 122 may be configured as, for example, one of the functions of the processor 101 or software stored in the ROM 102 for functioning the processor 101. The decision-making section 122 generates and outputs a command value C including a command for determining an adjustment amount of a movement speed of each motor of a robot with respect to a target speed of the tip end of the robot, the movement speed of each of the motors of the robot, and a movement path proximate to the tip end of the robot, based on a learning result of the learning section 110. When the decision-making section 122 outputs the command value C to the controller 2, the state of an environment changes accordingly.

The state observation section 106 observes, in a next learning cycle, state variables S that have changed after the output of the command value C to an environment by the decision-making section 122. The learning section 110 updates, for example, a value function Q (that is, an action value table) using the changed state variables S to learn an adjustment amount of a movement speed of each motor of a robot. Note that the state observation section 106 may observe the teaching speed adjustment amount data S1 from a RAM 103 of the machine learning device 120, as described in the first embodiment instead of acquiring the same from the state data S0 acquired by the state data acquisition section 3.

The decision-making section 122 outputs a command value C for commanding the adjustment of a movement speed of each motor of a robot, calculated based on a learning result, to the controller 2. By repeatedly performing the learning cycle, the machine learning device 120 advances the learning of an adjustment amount of a movement speed of each motor of a robot and gradually improves the reliability of the adjustment amount of the movement speed of each of the motors of the robot determined by the machine learning device 120 itself.

The machine learning device 120 of the controller 2 having the above configuration produces the same effect as that of the machine learning device 100 described above. Particularly, the machine learning device 120 may change the state of an environment with the output of the decision-making section 122. On the other hand, the machine learning device 100 may ask an external apparatus for a function corresponding to the decision-making section for reflecting learning results of the learning section 110 on an environment.

Figure 7:
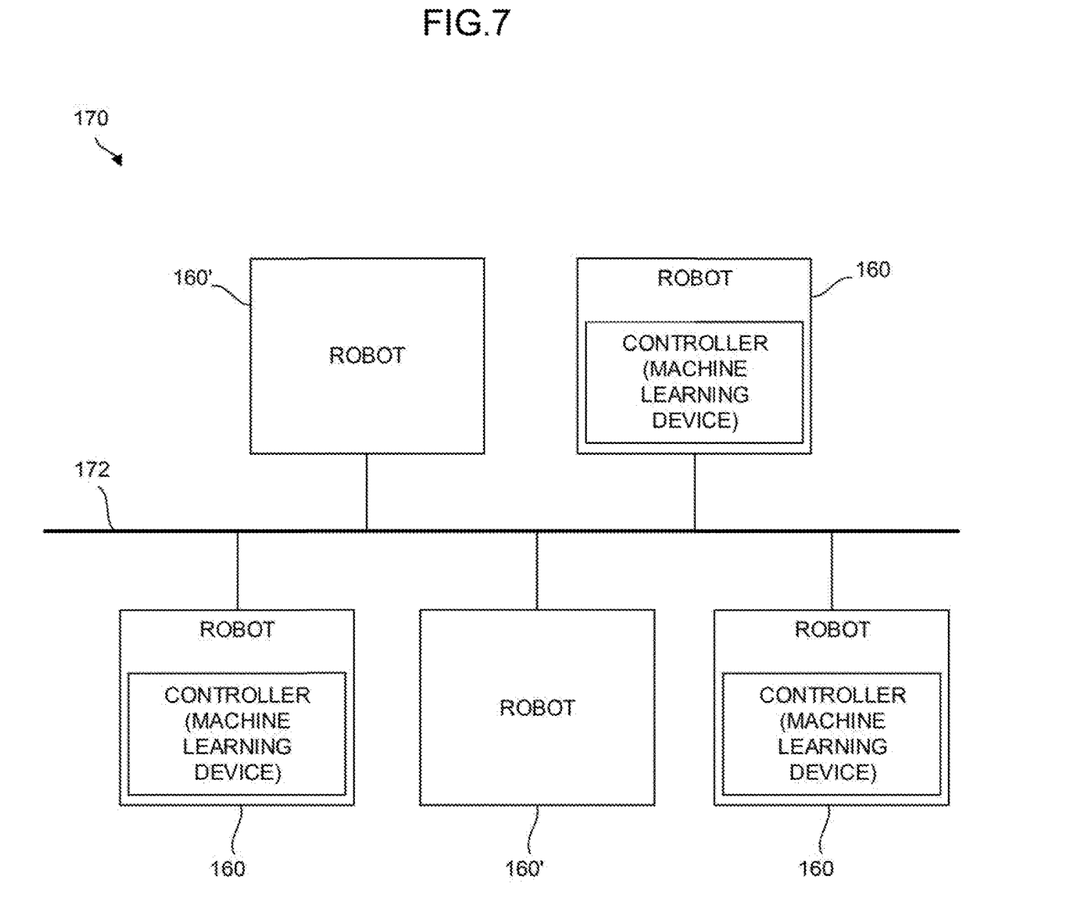
FIG. 7 is a schematic function block diagram showing an embodiment of a system including controlleres.

FIG. 7 shows a system 170 including robots 160 according to an embodiment.

The system 170 includes a plurality of robots 160 and 160' that performs at least the same operation and a wired/wireless network 172 that connects the robots 160 and 160' to each other. At least one of the plurality of robots 160 is configured as a robot 160 including the above controller 2. In addition, the system 170 may have robots 160' that do not include the controller 2. The robots 160 and 160' have a mechanism needed to perform an operation for the same purpose.

In the system 170 having the above configuration, the robots 160 including the controller 2 among the plurality of robots 160 and 160' may automatically and accurately calculate an adjustment amount of a movement speed of each motor of a robot with respect to a target speed of the tip end of the robot, the movement speed of each of the motors of the robot, and a movement path proximate to the tip end of the robot without relying on calculation or estimation using learning results of the learning section 110. In addition, the controller 2 of at least one of the robots 160 may learn an adjustment amount of a movement speed of each of the motors of the robot, which is common to all the robots 160 and 160', on the basis of the state variables S and determination data D obtained for each of the other plurality of robots 160 and 160' so that the learning results are shared between all the robots 160 and 160'. Accordingly, the system 170 makes it possible to improve the speed and the reliability of learning an adjustment amount of a movement speed of each of the motors of the robot with a broader range of data sets (including state variables S and determination data D) as inputs.

Figure 8:
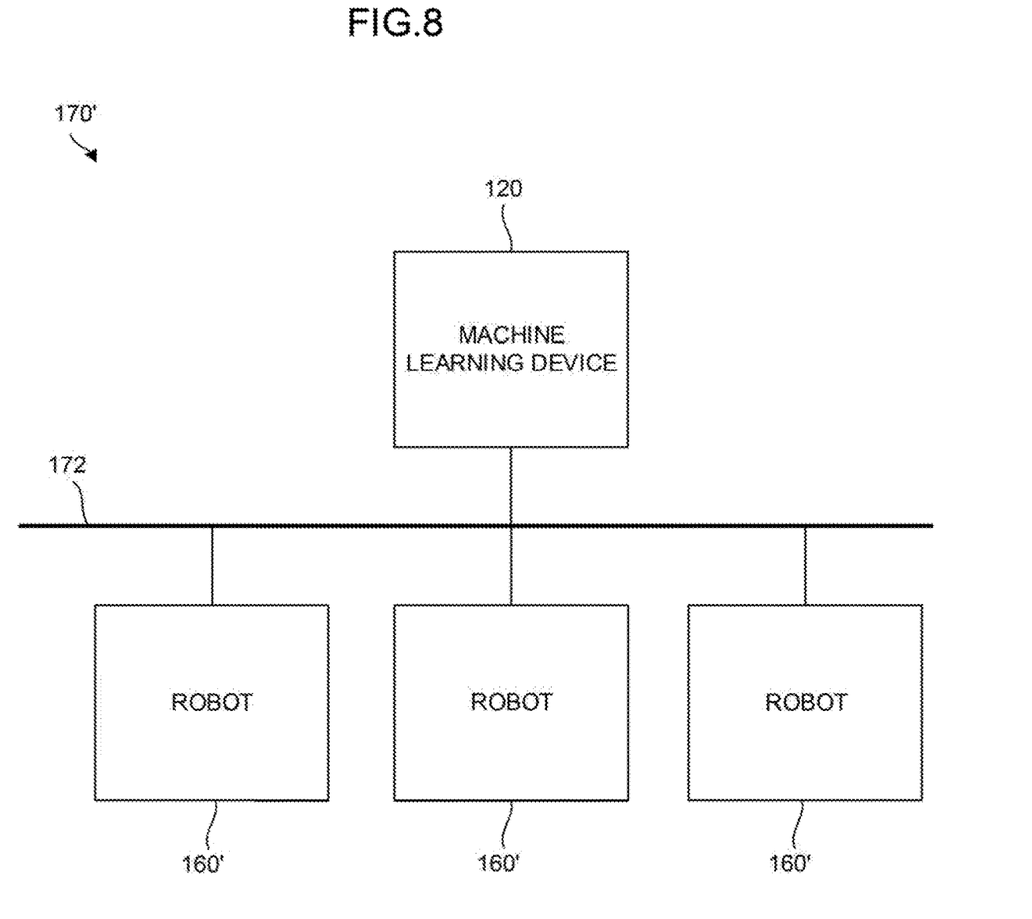
FIG. 8 is a schematic function block diagram showing another embodiment of a system including a controller.

FIG. 8 shows a system 170' including a plurality of robots 160' according to another embodiment.

The system 170' includes the machine learning device 120 (or 100), the plurality of robots 160' having the same machine configuration, and a wired/wireless network 172 that connects the robots 160' and the machine learning device 120 (or 100) to each other.

In the system 170' having the above configuration, the machine learning device 120 (or 100) may learn an adjustment amount of a movement speed of each motor of a robot with respect to a target speed of the tip end of the robot common to all the robots 160', the movement speed of each of the motors of the robot, and a movement path proximate to the tip end of the robot, based on state variables S and determination data D obtained for each of the plurality of robots 160', and automatically and accurately calculate the adjustment amount of the movement speed of each of the motors of the robot with respect to the target speed of the tip end of the robot, the movement speed of each of the motors of the robot, and the movement path proximate to the tip end of the robot, using the learning results, without relying on calculation or estimation.

In the system 170', the machine learning device 120 (or 100) may have a configuration existing in a cloud server or the like provided in the network 172. According to the configuration, a desired number of the robots 160' may be connected to the machine learning device 120 (or 100) where necessary regardless of the existing locations and the times of the plurality of robots 160'.

Workers engaging in the systems 170 and 170' may perform a determination as to whether the achievement degree of learning an adjustment amount of a movement speed of each motor of a robot with the machine learning device 120 (or 100) (i.e., the reliability of the adjustment amount of the movement speed of each of the motors of the robot) has reached a required level at an appropriate timing after the start of learning by the machine learning device 120 (or 100).

The embodiments of the present invention are described above. However, the present invention is not limited to the examples of the above embodiments and may be carried out in various modes with the addition of appropriate modifications.

For example, a learning algorithm performed by the machine learning devices 100 and 120, a calculation algorithm performed by the machine learning device 120, and a control algorithm performed by the controlleres 1 and 2 are not limited to the above algorithms, but various algorithms may be employed.

In addition, the above embodiments describe a configuration in which the controller 1 (or 2) and the machine learning device 100 (or 120) have a different CPU. However, the machine learning device 100 (or 120) may be realized by the CPU 11 of the controller 1 (or 2) and a system program stored in the ROM 12.

The invention claimed is:

1. A controller adjusting a movement speed of each motor of a robot that performs coating of a sealing material, the controller comprising:
   - a machine learning device that learns an adjustment amount of the movement speed of each of the motors of the robot by performing a machine learning algorithm including:
     observing, by a state observation section, state variables expressing a current operational state of the robot, the state variables including a teaching speed adjustment amount data indicating the adjustment amount of the movement speed of each of the motors of the robot, a target speed data indicating a target speed of a tip end of the robot, a movement speed data indicating the movement speed of each of the motors of the robot, and a movement path data indicating a movement path proximate to the tip end of the robot,
     acquiring, by a determination data acquisition section, determination data indicating a comparison between the movement speed and the target speed of the tip end of the robot is within an allowable range, and
     learning, by a learning section, based on the state variables and the determination data, an adjusted target speed data, an adjusted movement speed data, and an adjusted movement path data in association with the adjustment amount of the movement speed of each of the motors of the robot, and
   - wherein the controller controls the motors of the robot based on at least one of the adjusted target speed data, the adjusted movement speed data, and the adjusted movement path data.

2. The controller according to claim 1, wherein the determination data includes a position of the tip end of the robot.

3. The controller according to claim 1, wherein the learning section has
   a reward calculation section that calculates a reward associated with the determination data, and
   a value function update section that, by using the reward, updates a function expressing a value of the adjustment amount of the movement speed of each of the motors of the robot with respect to the target speed of the tip end of the robot, the movement speed of each of the motors of the robot, and the movement path proximate to the tip end of the robot.

4. The controller according to claim 1, wherein the learning section performs calculation of the state variables and the determination data on the basis of a multilayer structure.

5. The controller according to claim 1, further comprising:
   a decision-making section that outputs a command value based on the adjustment amount of the movement speed of each of the motors of the robot on a basis of a learning result of the learning section.

6. The controller according to claim 1, wherein the learning section learns the adjustment amount of the movement speed of each of the motors of the robot in each of a plurality of robots by using the state variables and the determination data obtained for each of the plurality of robots.

7. The controller according to claim 1, wherein the machine learning device exists in a cloud server.

8. A machine learning device learning an adjustment amount of a movement speed of each motor of a robot that performs coating of a sealing material, the machine learning device comprising:
   a state observation section that observes, as state variables expressing a current operational state of the robot, the state variables including a teaching speed adjustment amount data indicating the adjustment amount of the movement speed of each of the motors of the robot, a target speed data indicating a target speed of a tip end of the robot, a movement speed data indicating the movement speed of each of the motors of the robot, and a movement path data indicating a movement path proximate to the tip end of the robot;
   a determination data acquisition section that acquires determination data indicating a comparison between the movement speed and the target speed of the tip end of the robot is within an allowable range; and
   a learning section that learns, based on the state variables and the determination data, an adjusted target speed data, an adjusted movement speed data, and an adjusted movement path data in association with the adjustment amount of the movement speed of each of the motors of the robot,
   wherein the motors of the robot are controlled based on at least one of the adjusted target speed data, the adjusted movement speed data, and the adjusted movement path data.

* * * * *